Patented June 9, 1942

2,285,797

UNITED STATES PATENT OFFICE 2,285,797

RESINOUS MATERIALS

August Bellefontaine and Hanns Bernard, Krefeld-Uerdingen, and Albert Sieberg, Krefeld-Bockum, Germany No Drawing. Application March 11, 1939, Serial No. 261,350. In Germany March 14, 1938

20 Claims. (Cl. 260—23)

This invention relates to base materials for lacquers, coating agents, adhesives, impregnation agents and artificial masses and a process for the manufacture of the same.

In application Ser. No. 240,959 filed November 17, 1938, is described the preparation of valuable artificial resins, starting from polyhydric phenols which carry at least two allyl radicles or substituted allyl radicles, the said substituted phenols being converted for example by heating into resin-like polymerisation products. Among the polyhydric phenols are mentioned pyrocatechine, resorcine, hydroquinone, 1,2-dihydroxy-naphthalene, 1,7- dihydroxy - naphthalene, 1,2-dihydroxy-diphenyl and particularly those phenols which contain hydroxyl groups on at least two different nuclei, as for example dihydroxy - diphenyls, dihydroxy - naphthalenes, dihydroxy-diphenyl methanes and other polyhydroxy-polyhpenyl paraffins, such as the dihydroxy-diphenyl propane, polyhydroxy-polyphenyl-cyclo-paraffins, such as the dihydroxy-diphenyl-cyclo-hexane and polyhydroxy-polyphenyl olefines, such as dihydroxy-stilbene, which phenols are substituted by at least two of the aforesaid radicles.

As described in said application Ser. No. 240,959 these or other polyhydric phenols can first be converted in the manner known per se into their allyl or crotyl ethers, which compounds at elevated temperature, for example on distillation, are rearranged into nuclear substituted allyl phenols or crotyl phenols. The latter undergo on heating conversion to the resins.

The heating temperature may vary according to the conditions and there have been obtained good results at temperatures from about 180° to about 500° C. and especially from about 240° to about 350° C. The upper limit is fixed by the decomposition point of the substituted polyhydric phenols and the resins obtained. The time of heating required depends upon the special nature of the substituted polyhydric phenol and of the degree of temperature employed.

It has now been found, and this discovery constitutes the basis of this invention, that by heating those of the aforementioned phenol derivatives which have a polyhydroxy aryl structure and which therefore comprise at least two separate hydroxy aryl radicles to which at least an allyl or crotyl group respectively is attached, and which are capable of polymerisation, together with drying oils, for example China-wood oil, bodied linseed oil, soya-bean oil, sardine oil and the dehydration product of castor oil, oil-compatible natural resins, for example colophony, ester gum, copal, dammar, mastic, elemi and acaroid resin, oil-compatible artificial resins, for example resins obtained by condensation of maleic acid anhydride with colophony and subsequent esterification with glycerine, resins obtained by condensation of urea with formaldehyde, resins obtained by reaction of dimethylol urea with butanol, alkyd resins obtained by simultaneous esterification of ricinoleic acid, phthalic anhydride and glycerol or glycol montanic acids, or with oil-lacquers having a base of such materials, substances are obtained which possess unexpected advantages and which are particularly suited as base materials for the manufacture of lacquers, coating agents, adhesives, impregnation agents and artificial masses. It is noteworthy that in the presence of oils and resins the conversion of the phenol derivatives often takes place at temperatures which are lower than is necessary without said additions.

The heating temperature of the method of the present invention may vary according to the conditions and depends upon the special nature of the materials used. We have obtained good results at temperatures from about 80° to about 450° C. and especially from about 150° to about 300° C. The time of heating required depends upon the special nature of the materials used and upon the degree of temperature employed.

In a number of cases there is observed a heat evolution during the process which points to a chemical reaction between the constituents of the mixture. This latter phenomenon and the formation of the valuable conversion products also takes place if the allyl substituted phenols themselves are not used but their polymerisates which are fusible and still soluble f. i. in methyl acetate, ethyl acetate, butyl acetate, butanol, acetone, cyclohexanone, xylol and toluene. The said polymerisates may be obtained from the polyhydroxyphenols according to the directions of said application Ser. No. 240,959 described above.

If such polynuclear phenol derivatives are used as starting materials which contain the allyl residues or substituted allyl residues connected in an ether-like manner to the oxygen atoms of the phenolic hydroxy groups of at least two different nuclei, the conversion described likewise occurs, in which case probably at first migration of the allyl residue takes place from the oxygen to an ortho-position of the aromatic nucleus.

Instead of phenol derivatives substituted by simple allyl residues, those may be used which carry on one or more of the three carbon atoms of the allyl residue, alkyl (particularly methyl) substituents.

The invention is illustrated by the following examples, but is not restricted thereto. The parts are by weight.

Example 1

Into a solution of 912 parts of 4.4'-dihydroxy-diphenyl-dimethyl methane in 2000 parts of 16% caustic soda lye are allowed to drop at 40–45° C. with stirring 608 parts of allyl chloride. After the addition the mixture is heated within two hours at 80° C. The reaction mixture is then washed four times with water and distilled in vacuum. The distillate which passes over almost completely between 200 and 230° C. under 1-2 mm. contains in part the diallyl-ether of 4.4'-dihydroxy-diphenyl-dimethyl methane, in part the 3.3'-diallyl-4.4'-dihydroxy-diphenyl-dimethyl methane and probably also the mono-allyl-ether of 3-allyl-4.4'-dihydroxy-diphenyl-dimethyl methane. This is described in Example 1 of said application Ser. No. 240,959.

75 parts of raw China-wood oil are heated to 180° C. and 25 parts of the distillate above mentioned are added slowly thereto while stirring.

After this the temperature is gradually raised to 250° C. and finally maintained for about 15 minutes at this point. A further rise of the temperature which may take place spontaneously at this point is to be avoided and likewise the duration of heating should not be extended essentially beyond 15 minutes in order to avoid gelling. Since the China-wood oil is of varying properties the exact time of heating in each case should be determined by a preliminary test. After cooling to about 180° C. the product is thinned with 50 parts of white spirit. As a drier there are added 0.1 part of cobalt naphthenate and 0.3 part of lead naphthenate preferably in 33% solution. The lacquer so obtained shows good air drying properties. It yields coatings of high durability when exposed to the atmosphere, alkalies and acids and it is completely gas proof. The China-wood oil may also be rendered gas proof by a still smaller addition (e. g. 10%) of the distillate mentioned.

100 parts of the lacquer mentioned above are incorporated in the known manner with 30 parts of chromium oxide green. By this method a rapid drying and hardening enamel of good gloss, smooth surface and good resistance to water, alkalies and acids is obtained.

Example 2

6 parts of the said distillate mentioned in Example 1 and obtained according to Example 1 of application Ser. No. 240,959 from an allyl substituted 4.4'-dihydroxy-diphenyl-dimethyl methane are combined in the way described in Example 1 with 15 parts of raw China-wood oil. After the addition of 20 parts of ester gum and 20 parts of a bodied linseed oil the temperature is raised to 280° C. and maintained for 30 minutes. After cooling to 180° C. 40 parts of white spirit and as a drier 0.11 part of cobalt naphthenate and 0.33 part of lead naphthenate are added preferably in solution. A lacquer is obtained which shows the properties of the known fatty oil lacquer coatings in its smooth surface. Its durability properties, however, are considerably improved.

Example 3

A mixture of an oil lacquer which is obtained in the customary manner by heating 20 parts of a resin obtained by condensation of maleic acid anhydride with colophony and subsequent esterification with glycerine, 20 parts of raw China-wood oil, 10 parts of bodied linseed oil and 3 parts of the distillate mentioned in Example 1 and obtained according to Example 1 of said application Ser. No. 240,959 from an allyl substituted 4.4'-dihydroxy-diphenyl-dimethyl methane is heated to 280° C. To this product are added 20 parts of turpentine, 30 parts of white spirit, 0.09 part of cobalt naphthenate and 0.27 part of lead naphthenate. By this means an essentially improved lacquer is obtained.

Example 4

10 parts of an approximately 50% solution in butanol of a resin which is made by condensation of urea with formaldehyde in the presence of butanol or by reaction of dimethylol urea with butanol are combined with a solution of 5 parts of the distillate mentioned in Example 1 and obtained according to Example 1 of said application Ser. No. 240,959 from an allyl substituted 4.4'-dihydroxy-diphenyl-dimethyl methane in a mixture 2.5 parts of alcohol and 2.5 parts of toluene. The lacquer applied in the usual way yields after baking for one hour at 180° C. highly glossy tough films of good resistance to acids and alkalies.

Example 5

A lacquer made from 36 parts of the distillate mentioned in Example 1 (obtained according to Example 1 of said application Ser. No. 240,959 from an allyl substituted 4.4'-dihydroxy-diphenyl-dimethyl methane dissolved in 9 parts of xylol) and 42 parts of a tough alkyd resin (obtained by simultaneous heating of 350 parts of castor oil, 200 parts of glycerol and 325 parts of phthalic anhydride to 200° C. for about 5 hours), dissolved in 42 parts of xylol, 6 parts of castor oil, 2 parts of butanol and 8 parts of xylol is incorporated in known way with 30 parts of chromium oxide green. On baking for one hour at 180° C. this enamel yields glossy highly elastic coatings of good mechanical strength and resistance to water, alkalies and acids.

Example 6

90 parts of raw China-wood oil are heated to 180° C. Then 10 parts of the resinous body described in Example 1 of said application Ser. No. 240,959 and obtained by heating di-allyl-dihydroxy-diphenyl-dimethyl methane for 8 hours to 250° C. are added and the temperature slowly raised to 240° C. and maintained at this point for about 25 minutes. After cooling 50 parts of white spirit are added. This lacquer may be baked in directly heated gas ovens without crystallising and yields a hard and highly lustrous film.

Example 7

100 parts of raw China-wood oil are heated to 180° C. After addition of 100 parts of the distillate mentioned in Example 1 and obtained according to Example 1 of said application Ser. No. 240,959 the temperature is raised to 200° C. and maintained for about 15 minutes. After addition of 100 parts of bodied linseed oil the temperature is rapidly raised to 280° C. and maintained for 10 minutes. After cooling the product is thinned with 200 parts of white spirit and 100 parts of turpentine. Then as a drier there are added 0.3 part of cobalt naphthenate, 0.3 part of manganese and 1.8 parts of lead naphthenate. In this way a lacquer is obtained of good drying properties. The films obtained therefrom possess high hardness and mechanical resistance, good elasticity and highly glossy smooth surface.

*Example 8*

To a solution of 50 parts of an alkyd resin containing a large proportion of phthalic acid, modified with linseed oil, in 30 parts of xylol, 5 parts of butanol and 5 parts of turpentine, there are added 10 parts of a 50% toluene solution of the resinous body obtained by heating di-allyl-dihydroxy-diphenyl-dimethyl methane for 8 hours to 250° C. On baking this lacquer at 250° C. there is obtained even in a thick layer a smooth and glossy coating of good mechanical strength which is free from wrinkles. Without essential modification of the properties 100 parts of this lacquer may be incorporated with 30 parts of chromium oxide green and thus converted into an enamel.

Similar results are obtained when instead of the alkyd resins mentioned above other alkyd resins, such as the condensation products of isomertic phthalic acids, such as iso- or terephthalic acid, succinic acid, maleic acid and adipic acid with other polyhydric alcohols, such as pentaerythrite and trimethylol propane and, if desired, other monobasic acids, such as palmitic acid, stearic acid, oleic acid, the acid of China-wood oil or peanut oil are employed.

*Example 9*

100 parts of colophony are heated with 25 parts of the resinous body described in Example 1 of said application Ser. No. 240,959 and mentioned in Example 6 of this application for 10 minutes to 220° C. By this means the softening point of the resin is raised from about 65° to about 85° C.

Instead of the derivatives of the 4.4'-dihydroxy-diphenyl-dimethyl methane mentioned in the examples, the corresponding derivatives of other polyhydric phenols, some of which are mentioned above and described in application Ser. No. 240,959 may be used with generally the same result.

We claim:
1. Process which comprises heating material selected from the group consisting of a drying oil, an oil-compatible natural resin and an oil-compatible synthetic resin in admixture with material selected from the group consisting of a polyhydric polynuclear phenol in which at least one hydrogen atom of each of at least two different hydroxyaryl radicles thereof is replaced by a radicle selected from the group consisting of an allyl radicle and a crotyl radicle, and of a soluble and fusible polymerisation product of such a phenol.

2. Process which comprises heating at a temperature from about 80° to about 450° C. material selected from the group consisting of a drying oil, an oil-compatible natural resin and an oil-compatible synthetic resin in admixture with material selected from the group consisting of a polyhydric polynuclear phenol in which at least one hydrogen atom of each of at least two different hydroxyaryl radicles thereof is replaced by a radicle selected from the group consisting of an allyl radicle and a crotyl radicle, and of a soluble and fusible polymerisation product of such a phenol.

3. Process which comprises heating at a temperature from about 150° to about 300° C. material selected from the group consisting of a drying oil, an oil-compatible natural resin and an oil-compatible synthetic resin in admixture with material selected from the group consisting of a polyhydric polynuclear phenol in which at least one hydrogen atom of each of at least two different hydroxyaryl radicles thereof is replaced by a radicle selected from the group consisting of an allyl radicle and a crotyl radicle and of a soluble and fusible polymerisation product of such a phenol.

4. Process which comprises heating a drying oil in admixture with material selected from the group consisting of a polyhydric polynuclear phenol in which at least one hydrogen atom of each of at least two different hydroxyaryl radicles thereof is replaced by a radicle selected from the group consisting of an allyl radicle and a crotyl radicle, and of a soluble and fusible polymerisation product of such a phenol.

5. Process which comprises heating at a temperature from about 150° to about 300° C. a drying oil in admixture with material selected from the group consisting of a polyhydric polynuclear phenol in which at least one hydrogen atom of each of at least two different hydroxyaryl radicles thereof is replaced by a radicle selected from the group consisting of an allyl radicle and a crotyl radicle, and of a soluble and fusible polymerisation product of such a phenol.

6. Process which comprises heating at a temperature from about 180° to about 300° C. China-wood oil in admixture with a dihydroxy-diphenyl-dimethyl methane having an allyl radicle attached to each hydroxy phenyl radicle.

7. Process which comprises heating an oil-compatible synthetic resin in admixture with material selected from the group consisting of a polyhydric polynuclear phenol in which at least one hydrogen atom of each of at least two different hydroxyaryl radicles thereof is replaced by a radicle selected from the group consisting of an allyl radicle and a crotyl radicle, and of a soluble and fusible polymerisation product of such a phenol.

8. Process which comprises heating at a temperature from about 80° to about 300° C. an oil-compatible synthetic resin in admixture with material selected from the group consisting of a polyhydric polynuclear phenol in which at least one hydrogen atom of each of at least two different hydroxyaryl radicles thereof is replaced by a radicle selected from the group consisting of an allyl radicle and a crotyl radicle, and of a soluble and fusible poylmerisation product of such a phenol.

9. Process which comprises heating at a temperature from about 150° to about 250° C. an alkyd resin in admixture with a dihydroxy-diphenyl-dimethyl methane having an allyl radicle attached to each hydroxy phenyl radicle.

10. Process which comprises heating at a temperature of 250° C. a solution of an alkyd resin in xylol, butanol and turpentine obtained by the condensation of phthalic acid and a polyhydric alcohol with linseed oil in admixture with a dihydroxy-diphenyl-dimethyl methane having an allyl radicle attached to each hydroxy phenyl radicle.

11. Process which comprises heating an oil-compatible natural resin in admixture with material selected from the group consisting of a polyhydric polynuclear phenol in which at least one hydrogen atom of each of at least two different hydroxyaryl radicles thereof is replaced by a radicle selected from the group consisting of an allyl radicle and a crotyl radicle, and of a soluble and fusible polymerisation product of such a phenol.

12. Process which comprises heating at a temperature from about 200° to about 300° C. an oil-compatible natural resin in admixture with material selected from the group consisting of a polyhydric polynuclear phenol in which at least one hydrogen atom of each of at least two different hydroxyaryl radicles thereof is replaced by a radicle selected from the group consisting of an allyl radicle and a crotyl radicle, and of a soluble and fusible polymerisation product of such a phenol.

13. Process which comprises heating at a temperature from about 200° to about 300° C. colophony in admixture with a dihydroxy-diphenyl-dimethyl methane having an allyl radicle attached to each hydroxy phenyl radicle.

14. A product of the heat treatment of a mixture of material selected from the group consisting of a drying oil, an oil-compatible natural resin and an oil-compatible artificial resin with material selected from the group consisting of a polyhydric polynuclear phenol in which at least one hydrogen atom of each of at least two different hydroxyaryl radicles thereof is replaced by a radicle selected from the group consisting of an allyl radicle and a crotyl radicle, and of a soluble and fusible polymerisation product of such a phenol.

15. A product of the heat treatment of a mixture of a drying oil with material selected from the group consisting of a polyhydric polynuclear phenol in which at least one hydrogen atom of each of at least two different hydroxyaryl radicles thereof is replaced by a radicle selected from the group consisting of an allyl radicle and a crotyl radicle, and of a soluble and fusible polymerisation product of such a phenol.

16. A product of the heat treatment of a mixture of an oil-compatible synthetic resin with material selected from the group consisting of a polyhydric polynuclear phenol in which at least one hydrogen atom of each of at least two different hydroxyaryl radicles thereof is replaced by a radicle selected from the group consisting of an allyl radicle and a crotyl radicle, and of a soluble and fusible polymerisation product of such a phenol.

17. A product of the heat treatment of a mixture of an oil-compatible natural resin with material selected from the group consisting of a polyhydric polynuclear phenol in which at least one hydrogen atom of each of at least two different hydroxyaryl radicles thereof is replaced by a radicle selected from the group consisting of an allyl radicle and a crotyl radicle, and of a soluble and fusible polymerisation product of such a phenol.

18. A product of the heat treatment of China-wood oil and a dihydroxy-diphenyl-dimethyl methane having an allyl radicle attached to each hydroxy phenyl radicle.

19. A product of the heat treatment of an alkyd resin, obtained by the condensation of phthalic acid, a polyhydric alcohol and linseed oil, with a dihydroxy-diphenyl-dimethyl methane having an allyl radicle attached to each hydroxy phenyl radicle.

20. A product of the heat treatment of a mixture of colophony and a dihydroxy-diphenyl-dimethyl methane having an allyl radicle attached to each hydroxy phenyl radicle.

AUGUST BELLEFONTAINE.
HANNS BERNARD.
ALBERT SIEBERG.